United States Patent

Kolosov

[11] 4,073,448
[45] Feb. 14, 1978

[54] AUTOMATIC DEVICE FOR FIXING THE EDGE OF A MOVING BAND

[76] Inventor: Ivan Alexandrovich Kolosov, ulitsa Astrakhanskaya, 118, kv. 54, Saratov, U.S.S.R.

[21] Appl. No.: 721,708

[22] Filed: Sept. 9, 1976

[30] Foreign Application Priority Data

Sept. 10, 1975 U.S.S.R. .............................. 2172470

[51] Int. Cl.² ........................................... B65H 25/26
[52] U.S. Cl. ................................... 242/57.1; 226/19; 226/22; 226/23
[58] Field of Search ..................... 226/19, 22, 23, 45; 242/57.1

[56] References Cited

U.S. PATENT DOCUMENTS

| 2,552,189 | 5/1951 | Kuehni | 226/45 X |
| 3,039,483 | 6/1962 | Deering | 226/22 UX |
| 3,079,805 | 3/1963 | Rojecki | 226/23 X |
| 3,727,817 | 4/1973 | Tibavido | 226/19 |

*Primary Examiner*—Richard A. Schacher
*Attorney, Agent, or Firm*—Lackenbach, Lilling & Siegel

[57] ABSTRACT

An automatic device for fixing the edge of a moving band, wherein the roll holder that feeds the band over at least one bar, is controlled by the band roll cross-traverse mechanism. This mechanism is made as an air cylinder whose chambers communicate with a system of compressed gas through a number of pipings and throttle valves provided in each of said pipings, whereas connected with their inlets between each of the throttle valves and the respective chamber of the air cylinder are nozzles adapted to provide a uniform gas discharge from both air cylinder chambers at a time. At least one of said nozzles is provided with a closure adapted to interact with the band edge, and thus serves as the band edge position detector capable of effecting control over the air cylinder operation.

5 Claims, 3 Drawing Figures

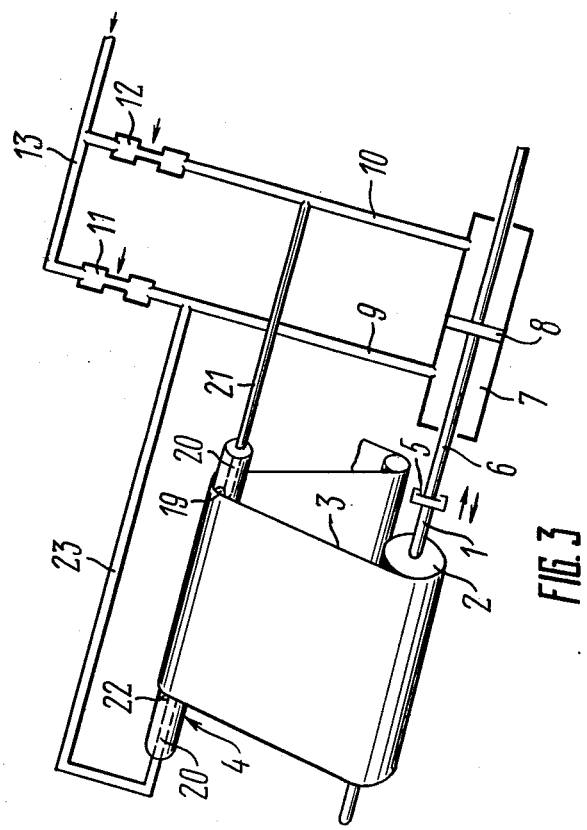

AUTOMATIC DEVICE FOR FIXING THE EDGE OF A MOVING BAND

The present invention relates generally to the production of storage cells and more specifically, to an automatic device for fixing the edge of a moving band of a separating material when slitting it into strips.

The device forms an integral part of an automatic system or arrangement for slitting a thermoplastic material into strips used for separating the electrodes of storage cells, and said arrangement in turn is incorporated into an automated storage cell assembly line.

The device proposed herein may be used in the production of storage cells, comprising separator elements of elastic materials in the form of a web, unwoven felt, paper, and the like, and more particularly in the production of Ni—Cd cells having an increased storage capacity for batteries applied in aircraft engineering, electromobiles, etc., said cells comprising electrodes with extra-fine low-strength separator elements.

The problem of fixing the edge of the separating material band resides in that slitting of such materials into strips is carried out at relatively low translational velocities of the band as the materials being handled possess but low strength and are thus liable to stretch out even under the effect of rather low forces applied thereto; this hampers the application of the known devices for centering and fixing the edge of bandlike materials that are extensively applicable in metallurgy, textile engineering, and in some other industries. That is why cutting up of the separating materials and packing the electrodes involved in the production of higher-capacity storage cells is performed both in the USSR and at the plants of leading foreign companies either manually or on semiautomatic production equipment or machinery which considerable strap and waste of the separating material.

One prior-art device for web centering is known to be used in web winding machines applied in, say, dressing and finishing works of textile industry (cf., e.g., USSR Inventor's Certificate No. 422,806 Class DO6c 3/06, 1974). This device comprises a centering roller rotatably mounted about the axis perpendicular to the axis of the roller over which the moving web is fed, a mechanism of roller turning in the web motion plane with a detector of the web edge position with respect to the roller, and a centering a roller axial movement mechanism with a detector of the web edge position with respect to the machine bed. In said device the edge of the moving web is fixed with respect to the bed by virtue of the web being offset along the roller axis. This is caused as a result of perpendicular misalignment of its axis with the direction of the web motion, under the effect of the position detector and the respective roller turning mechanism, as well as due to an axial roller displacement with respect to the driection of the web motion, under the action of the other position detector and the respective roller axial displacement mechanism made as controlled electromechanical actuator.

To provide a stable operation of such a device, the web should be tensioned to a great extent over the centering roller which makes the device impracticable for fixing the edge of low-strength bands of separating materials for storage cells. Moreover, said device is too complicated for economic manufacture and in complex in operation.

Known in the prior art are also devices for centering the separating material and fixing the edge of a moving band or strip (cf., e.g., USSR Inventor's Certificate No. 416,426 Class DO6c 3/06, 1974, or USSR Inventor's Certificate No. 325,418 Class F15b 3/100, 1972). These devices comprise a pneumatic detector made as a nozzle and located on the machine bed along the base line of motion of the band edge, and spool-valve and/or diaphragm-operated pneumatic amplifiers adapted for intensifying the pneumatic signal fed from the detector, which signal is then impressed upon the pneumatic actuators made as diaphragm-operated units or piston-type air cylinders associated with the centering rollers and adapted to restore the correct position of the band edge with respect to the base line.

Said devices comprise sophisticated units involving a high degree of precision to be manufactured, thus adversely affecting the reliability of fixing the band edge. The devices also envisage a considerable tension of the band for dependable operation of the centering rollers.

Thus, the aforementioned prior-art devices for centering and fixing the edge of a moving band are complicated in manufacture and operation, need considerable tension of the band for reliable operation of the centering rollers at an adequately high band translational velocity, which precludes their application for fixing the edge of fine and low-strength bands of separating materials for storage cells.

It is a primary object of the present invention to eliminate the aforesaid disadvantages of the known devices.

It is another object of the present invention to provide a simple and reliable automatic device for fixing the edge of a moving band that would make it possible to automate the cutting up of the separating material fed as a roll band, into strips, thus ensuring high precision of fixing and, hence, saving of the material due to a possibility of smaller allowances for strip width.

These and other objects are accomplished due to the fact that in an automatic device for fixing the edge of a moving band, comprising a roll holder adapted to feed the band into the machine over at least one bar; a band roll cross traverse mechanism made as an air cylinder whose chambers are communication with a system of compressed gas through a number of passage means or pipings; and a band edge position detector made as a nozzle with a closure and adapted to control the operation of the air cylinder. According to the invention, each of the pipings is provided with a throttle valve, and nozzles are connected with their inlets between each of the throttle valves and the respective chamber of the air cylinder so as to ensure a uniform gas discharge simultaneously from both air cylinder chambers, while at least one nozzle provided with a closure is adapted to interact with the band or well edge, performs the function of the band edge position detector.

It is expedient that at least one nozzle be made as an orifice provided in the cylindrical surface of the bar, and that use be made of the edge of the band fed over the bar, as the closure of said nozzle.

An automatic device for fixing the edge of a moving band, according to the present invention provides for the automatic cutting up of the extra-fine, low-strength separating material for a mechanized packing therein of the electrodes of the cells, as well as improves the degree of precision of fixing the band edge due to the fact that provision is made in the device for a system of an automatic follow-up after the band edge through the use of an air cylinder and two nozzles, ensuring a continuous and concurrent compressed gas discharge from both chambers of the air cylinder, while at least one nozzle serves as the band edge position detector of the "nozzle-closure" type, whereby the production process of the separating elements is made less labor-consuming, and considerable saving of the separating materials during their cutting up is attained and the operation of the automatic device in packing the electrodes is more reliable.

The device is simple to manufacture, set up and operate, and can find extensive application in any production processes involving the treatment of bandlike materials while in motion.

In what follows the invention is illustrated by some specific embodiments thereof with reference to the accompanying drawings, wherein:

FIG. 3 is another embodiment of the device of FIG. 1, having the nozzle made as two orifices provided in the surface of the band handling bar.

Figure 1:
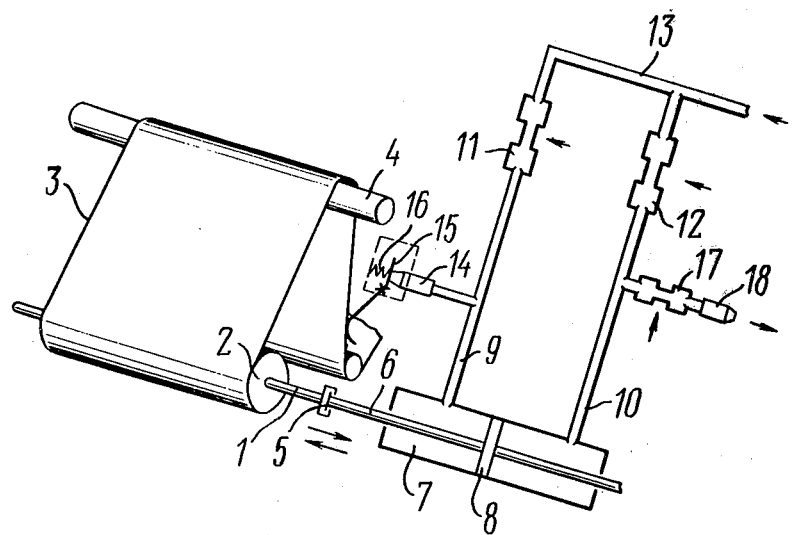
FIG. 1 is a schematic view of the constructional arrangement of the units of an automatic device for fixing the edge of a moving band, showing a connection diagram thereof.

Referring now to the accompanying drawings, FIG. 1 represents a roll holder 1 of the automatic device for fixing the edge of a moving band. The roll holder carrying a roll 2 to feed a band 3 into, say, an automatic machine (not shown) for slitting the band into strips. A bar 4 is provided nearby the roll 2, mounted in parallel to the axis of the latter, for the band 3 to bend over said bar while in motion. The end of the roll holder 1 includes means, such as bayonet joints 5 for coaxially connecting the roll holder 1 to a rod 6 of the cross-traverse mechanism of the roll 2. The latter mechanism incorporates a double-acting air cylinder 7, wherein the rod 6 with a piston 8 reciprocates. A pair of chambers of the air cylinder 7, are located on both or opposite sides of the piston 8, and they communicate with a compressed-gas supply along passage means or pipings 9 and 10 through respective throttle valves 11 and 12, and another passage means or common piping 13.

A nozzle 14 is provided in the piping 9 between the throttle valve 11 and the inlet of the left-and chamber of the air cylinder 7, said nozzle being adapted for communicating said chamber with the atmosphere. The nozzle 14 forms part of the position detector of the edge of the band 3, said detector comprising also a closure 15 made as an arm whose one end shuts up the exit orifice of the nozzle 14 under the action of a spring 16, while the other end rests upon the edge of the moving band 3.

To provide an equilibrium state of the piston 8 under various operating conditions, a throttle valve 17 is mounted on the segment of the piping 10 between the throttle valve 12 and the inlet of the right-hand chamber of the air cylinder 7 so as to enable communcation between the latter chamber with the atmosphere through a nozzle 18.

The automatic device for fixing the edge of a moving band, according to the present invention operates as follows. In order to tune up a completely assembled device, the piping 13 (FIG. 1) is connected to the compressed-gas supply system. Then using the throttle valve 17 and the closure 15, one should set up an approximately equal amount of the gas discharge from the nozzles 14 and 18; thereupon, by appropriately adjusting the throttle valves 11 and 12, one should try to stop the piston 8 in approximately the middle position. This having been attained, the piston 8 should slide to the right (with the nozzle 14 fully shut up by the closure 15), thus shifting the edge of the band 3 towards the arm of the closure 15, whereas with the nozzle 14 open (by pressing the arm of the closure 15), the piston 8 should slide to the left, thus shifting the edge of the band 3 away from the arm of the closure 15.

If the piston 8 slides to the right and to the left at different speeds, one must readjust the throttle valves 11 and 12 so as to attain equal travelling speeds of the piston 8 in both directions.

Further tuning up of the device is performed with the band 3 moving. If the response of the system is found to be dissimilar during the shifting of the edge of the band 3 to both sides, one should adjust the throttle valve 17 trying to displace the middle position of the closure 15 with respect to the nozzle 14 (with the piston 8 in the state of equilibrium) towards higher response. If the axial speed of the roll 2 actuated by the piston 8 is found too high (which is indicative by a continuous drifting of the band 3 about the central position) one should either reduce the passage area of the both throttle valves 11, 12 or diminish the gas pressure in the system.

If the edge of the band 3, while being shifted to either side, slowly returns to the central position, one should either raise the gas pressure upstream of the throttle valves 11, 12 or slightly open both of the throttle valves 11, 12 at a time. Once having been tuned up in such a way the device is in a position of fixing automatically the edge of the moving band 3 in a present position. Thus, when the edge of the band 3 running off the roll 2, shifts to the right to press the arm of the band edge position detector, the closure 15 is moved off the exit end of the nozzle 14 to increase the stream of gas discharged from the left-hand chamber of the air cylinder 7. As a result, the pressure in the left-hand chamber of the air cylinder 7 drops, and the piston 8 slides to the left to displace the roll 2 likewise to the left, thus restoring the preset position of the edge of the band 3 and the position of the closure 15 with respect to the exit end of the nozzle 14. Thus, the pressure in the both chambers of the air cylinders gets equalized, and the state of equilibrium in the entire system occurs. When the edge of the band 3 shifts to the left, the piston 8 slides in the opposite direction in a similar way.

Provision of the device for fixing the edge of the moving band 3 incorporating the band edge position detector of the construction represented in FIG. 1, is reasonable to be used for bands having an adequately stiff edge, or in the case of a gauzelike material offering but inconsiderable resistance to the gas stream passing therethrough.

For bands made of rather dense materials, e.g., such as textile, film, paper, and the like the device for fixing the edge of a moving band is to be implemented as follows.

In the device for fixing the edge of a moving band, according to the present invention the detector of edge position of the band 3 (FIG. 2) comprises a nozzle 19 made as an orifice in the cylindrical surface of the bar 4, while the edge of the band 3 performs the function of a closure for said nozzle. Besides, a blind hole 20 is provided in the face of the bar 4 to communicate the nozzle 19 with the right-hand chamber of the air cylinder 7 via a piping 21 and the piping 10. The throttle valve 17 and the nozzle 18 are in this case mounted on the piping 9 to communicate with the left-hand chamber of the air cylinder 7 with the atmosphere. All the rest of the units of the device are provided similarly to those of the device of FIG. 1.

Figure 2:
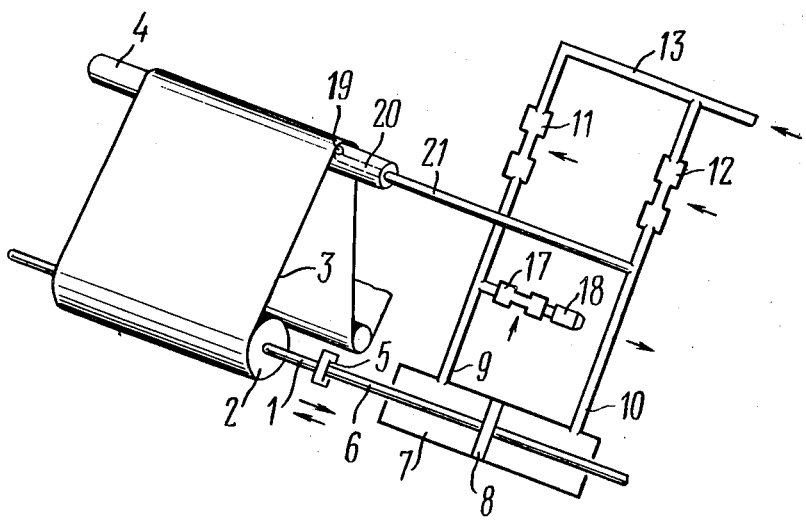
FIG. 2 is an embodiment of the device of FIG. 1, having the nozzle made as an orifice in the band handling bar.

The tuning-up procedure of the device of FIG. 2 is carried out in a way similar to that described herein before, trying to bring the piston 8 in the state of equilibrium (when the edge of the moving band 3 is positioned centrally of the exit orifice of the nozzle 19) by adjusting the compressed gas stream discharged from the nozzle 18, with the aid of the throttle valve 17.

For stable-width bands whose width is variable with the tolerance margin (not over ±1.5 mm), it is reasonable to use the device for fixing the edge of a moving band as represented in FIG. 3.

In this case, an orifice 22 is made in the cylindrical surface of the bar 4, spaced apart from the nozzle 19 at a distance equal to an average width of the band 3. Besides, the blind hole 20 is also provided in the other face of the bar 4 to communicate the orifice 22 with the left-hand chamber of the air cylinder 7 through a piping 23 and the piping 9, thus ensuring a uniform compressed-gas discharge from the both chambers of the air cylinder 7 simultaneously through the nozzle 19 and the orifice 22. Both of the edges of the moving band 3 play or constitute the part of a closure in this case.

In the above case, the tuning-up of the device simply amounts to adjusting the throttle valves 11 and 12, and trying to attain an identical position of the both edges of the band 3 with respect to the orifice of the nozzle 19 and to the orifice 22.

The response of the system to a change in the position of the band 3 is in this case twice as high, this being due to the fact that the band shifting to either side causes the pressure in one of the chambers of the air cylinder 7 to fall and that in the other chamber of that cylinder to rise by the same value.

The device of FIG. 3 is expedient to be applied for fixing the edge of bands having strictly imposed tolerance as to width. Such an embodiment of the device provides for a maximum response and highest precision of fixing the band edge.

The device of FIG. 2 is expedient to be used for bands whose width varies within broad limits.

The device of FIGS. 2 and 3 differs from that of FIG. 1 as they are simple to manufacture, tune up and operate. Therefore, the device of FIG. 1 is reasonable to be applied only for bands that offer no substantial obstruction for gas streams, say, for gauzelike bands, etc.

The automatic device for fixing the edge of a moving band, according to the present invention is capable of automating the cutting-up process of the separating material for a mechanized packing of cell electrodes, comprising extra-fine and low-strength separating elements, improving the accuracy of the cutting-up process and maximizing the degree of saving of the separating material. This is due to the fact that provision is made in the pipings 9, 10 communicating with both chambers of the air cylinder 7 with the compressed-gas system, for the nozzles 14, 18 which enable a continuous and concurrent discharge of the compressed gas from the both chambers of the air cylinder 7 through the nozzles 14, 18 into the atmosphere, while at least one of said nozzles serves as the position detector of the moving band edge.

Such a connection pattern of the elements of the pneumatic control circuit features a reasonably high response to the minutest variations of the amount of gas stream discharge through the nozzles, which together with an obvious simplicity of the device ensures a necessary accuracy of fixing the band edge and enables the strip width allowance to be substantially reduced.

The device is simple to manufacture, tune up and operate; it can find many of an extensive application in any production processes involving the treatment of bandlike material while in motion.

What is claimed is:

1. An improved device for fixing the edge of a moving band or web of sheet material employing a system of compressed gas supply and a roll holder adapted to feed said band over at least one bar, comprising: a band cross-traverse mechanism including a double-acting air cylinder having a piston and rod coupled to said roll holder and having a pair of opposite chambers in communication with said compressed-gas supply through associated pipings; throttle valves provided in each of said pipings; at least two nozzles, each being connected through its inlet to one of said pipings and each being located between one of said throttle valves and one of the chambers of said air cylinder, thus ensuring a uniform gas discharge simultaneously from both chambers of said air cylinder; and at least one of said nozzles having a closure or band edge position detector means adapted to interact with the edge of said band and being adapted to effect control over the operation of said air cylinder; whereby the edge of said bands or web is automatically maintained in a desired fixed position by said band cross-traverse mechanism which shifts or displaces said roll holder due to to variations in the pressure in said chambers of said air cylinder.

2. An automatic device for fixing the edge of a moving band or web of sheet material as claimed in claim 1, wherein at least one nozzle is in the form of an orifice in the cylindrical surface of said bar, and the edge of the band passing over said bar serves as the closure or band edge position detector means of said nozzle.

3. An automatic device for fixing the edge of a moving band or web of sheet material as claimed in claim 1, wherein said closure is in the form the an arm-like element, one end of which is adapted to close off the exit orifice of said nozzle having said closure, while the other end of which is adapted to rest upon the edge of said moving band or web.

4. An automatic device for fixing the edge of a moving band or web of sheet material as claimed in claim 3, including biasing means for constantly urging said arm-like element to close off the exit orifice of said nozzle having said closure.

5. An automatic device for fixing the edge of a moving band or web of sheet material as claimed in claim 1, wherein a pair of nozzles in the form of orifices are provided in the cylindrical surface of said bar, and are spaced from each other a distance approximately equal to the average width of said band or web, whereby both edges of the moving band constitute said closure and the response time to a change in the position of said band or web is about double as compared to a single edge position detector.

* * * * *